No. 789,016.

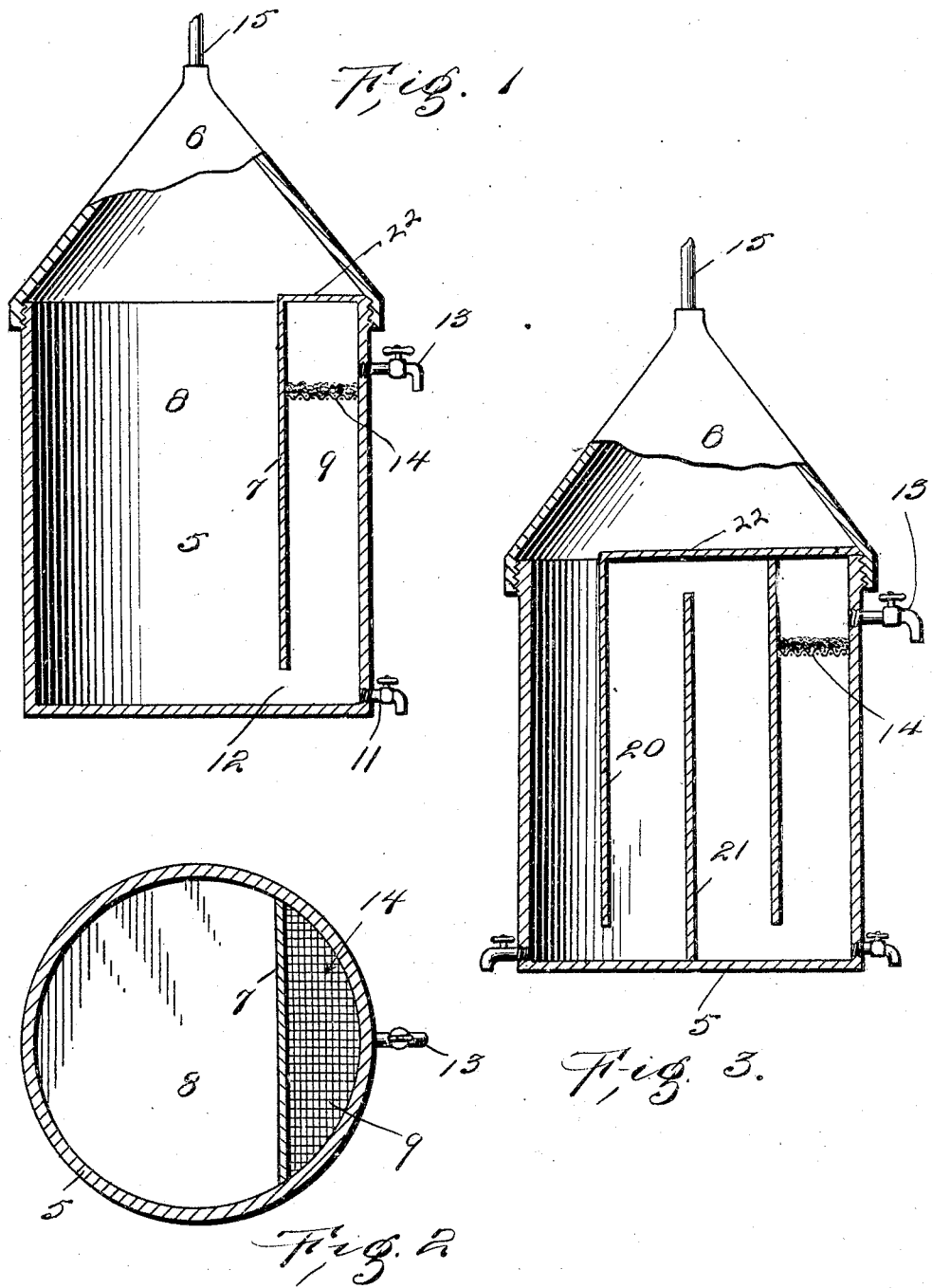

Patented May 2, 1905.

UNITED STATES PATENT OFFICE.

MAGGIE LEE FRANKS, OF IMBODEN, ARKANSAS, ASSIGNOR OF ONE-HALF TO J. L. McKAMEY, OF IMBODEN, ARKANSAS.

FILTER.

SPECIFICATION forming part of Letters Patent No. 789,016, dated May 2, 1905.

Application filed October 31, 1903. Serial No. 179,301.

*To all whom it may concern:*

Be it known that I, MAGGIE LEE FRANKS, a citizen of the United States, residing at Imboden, in the county of Lawrence, State of Arkansas, have invented certain new and useful Improvements in Filters; and I do hereby declare the following to be a full, clear, and exact description of the invention, such as will enable others skilled in the art to which it appertains to make and use the same.

This invention relates to filters; and it has for its object to provide a construction wherein the water or other liquid passed through the filter will be permitted to settle in bulk and in which the water or other liquid will rise in a column to the filter-bed to permit of settling of foreign matter and whereby the contact of the foreign matter with the bottom of the filter-bed will assist in separating such matter from the liquid.

In the drawings forming a portion of this specification, and in which like numerals of reference indicate similar parts in the several views, Figure 1 is a vertical section through a filter embodying the present invention, said section being at right angles to the vertical partition. Fig. 2 is a horizontal section through the filter, the filter-bed being shown in bottom plan. Fig. 3 is a view similar to Fig. 1, showing a second form of the invention.

Referring now to the drawings, there is shown a filter comprising a main body portion 5, which is illustrated as cylindrical, although it will be understood that it may have any other desired specific shape, the body portion being provided with a conical cap 6.

A vertical partition 7 is arranged within the body portion 5 at one side of the axis thereof, so that a main settling-chamber 8 and a minor filter-chamber 9 are provided, the latter having a drain-cock at its lower end, as illustrated at 11, and communicating with the settling-chamber through the passage 12, which is formed by terminating the partition short of the lower end of the body 5. The filter-chamber is closed at its upper end, and leading from its side directly below the upper end is the outlet-pipe 13, through which the filtered water passes. In the filter-chamber directly below the outlet-pipe is a transverse sieve 14, which extends throughout the breadth of the filter-chamber, so that a liquid in rising in the filter-chamber to the outlet-pipe must pass through the sieve.

In the lid of the body of the filter is an inlet-pipe 15, the water in its passage through the filter passing first into the settling-chamber to the bottom thereof, then transversely beneath the partition into the filter-chamber, and then upwardly in the filter-chamber against the sieve, through which it then passes to the outlet-pipe. As the settling-chamber is kept full of water or other liquid and as it is the pressure in this chamber that forces the water or other liquid through the filter-bed, there is little tendency of the water as it enters the settling-chamber to agitate the water therein.

It is found that with the filter described the foreign matter that does not settle in the larger chamber is precipitated when it comes in contact with the filter-bed, so that the water when it passes from the outlet-pipe is free from foreign matter.

In Fig. 3 of the drawings there is shown a construction wherein two additional partitions 20 and 21 are employed. The partition 20 extends from the top of the cylindrical portion of the filter to a point near to the bottom thereof, and the partition 21 extends from the bottom to a point near the top, the last-named partition being between the partition 20 and the partition 7. The partitions 20 and 21 are vertical, and parallel with the partition 7 and extending from the partition 20 over the partitions 21 and 7 is a plate 22, which serves to direct the water into the space between the partition 20 and the adjacent side of the body of the filter, so that the water passes down and under the partition 20 and then up and over partition 21 and then down and under partition 7.

What is claimed is—

A filter adapted to filter water under pressure, comprising a sealed body portion having a cap secured thereonto, an inlet-pipe engaged through the top of the cap, a horizontal plate at the top of the body portion and connected to a portion of the side of the latter, a vertical plate extending from the free edge of the top plate downwardly to near the bottom of the body and connected at its vertical edges to the side wall of the body, a filter-bed beneath the horizontal plate and extending from the vertical plate to the wall of the body, an outlet-pipe engaged through the wall of the body between the filter-bed and the horizontal plate, a regulating-valve for the outlet-pipe and the drain-pipe at the bottom of the body beneath the filter-bed.

In testimony whereof I affix my signature in presence of two witnesses.

MAGGIE LEE FRANKS.

Witnesses:
J. L. McKAMEY,
M. F. HENDERSON.